Figure 1:
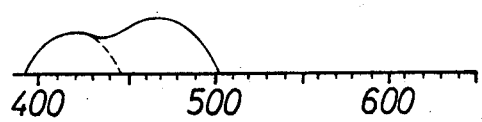
Figure 2:
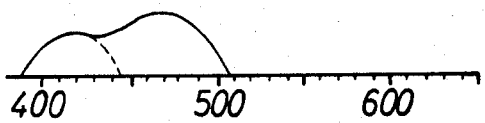
Figure 3:
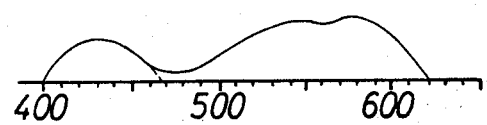
Figure 4:
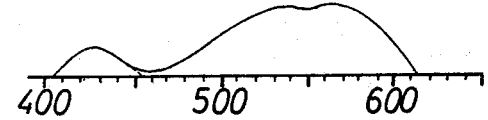

United States Patent Office 3,385,707
Patented May 28, 1968

3,385,707
OPTICALLY SENSITIZED PHOTOGRAPHIC
MATERIALS CONTAINING NEUTROCYANINE DYES
Oskar Riester, Leverkusen, and Max Glass, Cologne-Hoehenhaus, Germany, assignors to Agfa Aktiengesellschaft, Leverkusen, Germany, a corporation of Germany
Filed May 14, 1964, Ser. No. 367,438
Claims priority, application Germany, May 18, 1963,
A 43,141
14 Claims. (Cl. 96—102)

The invention relates to photographic materials with at least one silver halide emulsion layer optically sensitized with a neutrocyanine dye having a basic heterocyclic radical attached to an aryl radical with sulfo substituents.

Neutrocyanines which contain an acid heterocyclic grouping attached to an aryl ring substituted with carboxyl or sulfo radicals are known. By the term "acid heterocycles" are to be understood heterocyclic compounds containing nitrogen atoms which are not quaternizable. Such heterocyclic rings are only capable of forming salts with cations such as metallic ions. By the term "basic heterocycles" on the other hand we mean heterocyclic compounds containing as a ring member a nitrogen atom which is quaternizable. It is known that the sensitizing properties of these known sensitizers were substantially impaired by the substitution with a sulfoaryl grouping to a degree that such substituted compounds do not exhibit any utility. Accordingly it is an object of the invention to provide novel neutrocyanine dyes containing a basic heterocyclic grouping attached to an aryl ring which is substituted with an acid radical. Another object is to provide methods for producing such neutrocyanines dyes. Still another object is to provide photographic emulsions optically sensitized with these new dyes. Other objects will become apparent from a consideration of the following description and examples.

We now have found that neutrocyanines the basic heterocyclic grouping of which contains an aryl ring preferably phenyl or naphthyl which is substituted with a sulfo group, are excellent sensitizers. The neutrocyanines according to the invention are far more effective than the corresponding unsubstituted dyes. The dyes of the invention can advantageously be represented by the following formula:

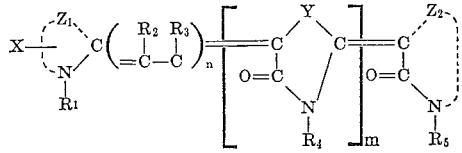

wherein $Z_1$ represents the non-metallic atoms necessary to complete a 5-membered or 6-membered heterocyclic ring; suitable are the heterocyclic rings which are usual in cyanine chemistry, for example, oxazoles, oxazines, thiazoles, selenazoles, thiodiazoles, oxadiazoles, imidazoles, pyrimidines, pyridines, quinolines, isoquinolines, thiazolines or indolenines.

Y represents —O—, —S—, —Se—, or

X represents an aryl grouping preferably phenyl or naphthyl, which is substituted by at least one sulfo group and which can be connected to the adjacent heterocyclic ring, either by fusion or as a simple substituent;

$Z_2$ stands for the non-metallic atoms necessary to complete 5- or 6-membered heterocyclic rings which are usual in cyanine chemistry such as pyrazolones, oxazolones, oxazinones, benzoxazinones, thiazolones, imidazolones, pyrimidinones, pyridinones, quinolinones or isoquinolinones.

R and $R_1$–$R_5$ represent hydrogen atoms or alkyl preferably lower alkyl having up to 5 carbon atoms such as methyl, ethyl or propyl, aryl preferably phenyl or aralkyl such as benzyl or phenyl ethyl.

$m$ and $n$ each represent an integer from 0 to 3.

These compounds are produced from the 2-mercapto derivatives of these heterocyclic sulfonic acids, which are initially reacted in a manner known per se to give the thioethers by treatment with alkylation agents, such as dimethyl sulfate, diethyl sulfate or alkyltoluene sulfonic acid esters.

These sulfonic acids and their salts have very high melting points and, consequently, further reaction with alkylation agents, which is intended to lead to the addition of the alkyl radical to the nitrogen atom of the heterocyclic ring system, is relatively difficult. It is expediently performed with an excess of the alkylation agent or in the presence of a solvent, such as m-cresol, phenol or anisole, at temperatures from 50 to 250° C., preferably from 100 to 200° C. This difficulty might be a reason why this reaction has so far remained unknown.

The production of the dyestuffs takes place in accordance with the following equation:

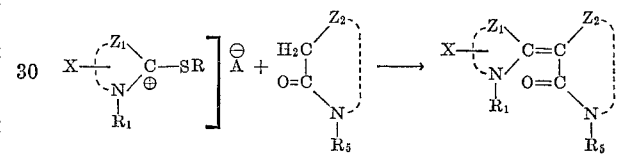

$A^\ominus$ stands for any anion.

If there is a C=S group in this neutrocyanine, the alkylation and the reaction with a compound containing active methylene groups can be repeated. The spectral sensitising action is excellent and the dyeing of the layer is negligible after completion of the photographic process, since the dyestuffs migrate entirely from the photographic layers during the processing of the exposed material.

Silver halide emulsion layers which contain silver chloride, silver bromide or mixtures thereof and which might additionally contain up to 10 mol percent of silver iodide can be used as light-sensitive layers. Gelatine is preferred as binder for the light-sensitive layers, but this can be wholly or partially replaced by other layer-forming, hydrophilic colloids, depending upon the properties which are required. Suitable, for example, are polyvinyl alcohol, polyvinyl pyrrolidone, starch or starch ether, alginic acid and derivatives thereof such as salts particularly with alkali metals, esters or amides or carboxymethyl cellulose and the like.

The dyes of the present invention are advantageously incorporated in the washed and finished emulsion and should be uniformly distributed throughout the emulsion. The methods of incorporating the dyes in an emulsion are simple and well known to those skilled in the art of emulsion making. It is convenient to add the dyes from solution in appropriate solvents. This is particularly simple in the case of the present dyes since the dyes are readily soluble in water and they can be employed accordingly in aqueous solutions. It is, however, possible to apply solutions of the dyes in solvents such as alcohols and phenols or in a mixture of those solvents with water. The solvent must be compatible with the emulsion and substantially free from any deleterious effect on the silver halide emulsion. Water or methanol or a mixture thereof has proven satisfactory as a solvent for the majority of the new dyes.

The concentration of the sensitizing dyes of the present invention in the silver halide emulsion can vary widely, for example, from about 2 to 200 mg. preferably 10 to 60 mg. per kg. of the emulsion. The concentration of the dye will vary according to the type of light-sensitive material in the emulsion and according to the characteristics desired. The suitable and optimal concentration for any given emulsion will be apparent to those skilled in the art upon making the ordinary tests customarily used in the art of emulsion making.

The dyestuffs are in addition particularly insensitive to other additives which are commonly used, as for example, wetting agents, stabilisers, bactericides, fungicides, hardeners and developers added to the layer, and also to other additives, such as color couplers, in their water-soluble or emulsified form, and to other dyestuffs such as anti-halo or filter dyes or azo dyestuffs in the silver-dye-bleach process for example.

EXAMPLES FOR THE PREPARATION OF THE DYES

Compound 1

3 g. of the sodium salt of 2-methylmercapto-5-sulfo-benzthiazole are heated for 15 minutes in an oil bath at 160° C. with 15 ml. of dimethyl sulfate. After cooling, the resulting quaternary salt is triturated with acetone. 90 ml. of pyridine, 9 g. of N-ethyl rhodanine and 6 ml. of triethylamine are then added and the mixture is stirred vigorously for 2 hours at 20° C. and left to stand for 12 hours. The resulting yellow crystals are suction-filtered, washed with propanol and purified by dissolving in 600 ml. of water+100 ml. of methanol, filtering, and precipitating with 10 ml. of 25% by weight sodium acetate solution. The suction-filtered crystal powder is dried at 80° C. Yield: 3.1 g; M.P. above 300° C. The dye dissolves in water and methanol to give a pure yellow solution. The sensitisation maximum is at 470 m/$\mu$.

Compound 2

The quaternary salt described in the preceding example is stirred with 20 ml. of m-cresol, 1.5 g. of N-ethyl-4-oxazolidone-2-thione and 16 ml. of triethylamine for 4 hours at 20° C. The precipitated pale yellow crystals are washed with a little alcohol and recrystallized from 10 ml. of water. Yield: 1.4 g.; M.P. above 300° C. The sensitization maximum is at 442 m/$\mu$.

Compound 3

2.7 g. of 2-methylmercapto-3-methyl-benzoxazolium-5-sulfonic acid betaine, which was prepared as described in connection with Compound 1 from 2-methylmercapto-benzoxazole-5-sulfonic acid and dimethyl sulfate, is stirred with 20 ml. of cresol, 1.5 g. of N-ethyl rhodanine and 8 ml. of triethylamine for 1½ hours at 20° C. The reaction product which crystallizes out is triturated with 100 ml. of ether, the ether is decanted, the residue is dissolved in 15 ml. of methanol and 0.5 g. of NH$_4$Cl is added. The dyestuff ammonium salt crystallizing out is suction-filtered, dissolved in 10 ml. of water and, after adding 0.5 g. of NH$_4$Cl, is again crystallized. The light yellow crystals are washed with a little alcohol and dried at 80° C. The yield is 1 g.; M.P. above 300° C. The sensitization maximum is at 453 m/$\mu$.

Compound 4

11.5 g. of the sodium-dimethyl sulfate quaternary salt of 2-methylmercaptothiodiazole-5-thione-4-phenyl-3'-sulfonic acid, produced as described under compound 10, are vigorously stirred with 1.6 g. of N-ethyl rhodanine in 20 ml. of pyridine. After adding 2 ml. of triethylamine, the stirring is continued for another 4 hours at 20° C. After standing for 12 hours at 20° C., the dye is precipitated with ether, the solution is decanted and the residue triturated several times with ether. The yellow dyestuff powder is ground with a little methanolic sodium dye solution, whereupon it becomes crystalline. After separation by pressing, the dye is recrystallized from 150 ml. of methanol. Yield: 3.2 g.; M.P. above 300° C. The sensitization maximum is at 470 m/$\mu$.

Compound 5

3 g. of sodium-2-methylmercapto-4,5-benzo-benzoxazole-6-sulfonate and 6 ml. of dimethyl sulfate are heated for 40 minutes at 165° C. After cooling, 20 ml. of pyridine, 1 g. of N-ethyl rhodamine and 2 ml. of triethylamine are added while stirring, and the stirring is continued for 1 hour at 20° C., after being left to stand for 12 hours at 20° C., the dyestuff which has formed is suction-filtered and washed with n-propanol. It is recrystallized from 10 ml. of water and 40 ml. of 25% by weight sodium acetate solution. Yield: 0.7 g.; M.P. above 300° C.

Sodium - 2 - methylmercapto-4,5-benzo-benzoxazole-6-sulfonate is prepared as follows:

75 g. of sodium-2-mercapto-4,5-benzo-benzoxazole-6-sulfonate are dissolved in 670 ml. of water with 37.5 g. NaOH. 9 ml. of dimethyl sulfate are added dropwise in 15 minutes while stirring at a temperature below 30° C. After 1 hour, the precipitated crystals are suction-filtered and recrystallized from a mixture of 500 ml. of water and 150 ml. of methanol. Yield: 42 g.; M.P. above 300° C.

The sensitization maximum is at 456 m$\mu$.

Compound 6

3 g. of sodium-2-methylmercapto-beta,beta-naphthoxazole-7-sulfonate are heated with 5 ml. of dimethyl sulfate for 30 minutes at 165° C. After cooling in ice, 20 ml. of pyridine, 2 g. of N-ethyl rhodanine and 2 ml. of triethylamine are added while stirring. After standing for 12 hours at 20° C., the dystuff which has crystallized out is suction-filtered, washed with n-propanol and recrystallized from 150 ml. of 50% by weight methanol. Yield: 1.1 g.; M.P. 293–296° C.

The sodium-2-methylmercapto-beta,beta-naphthoxazole-7-sulfonate is obtained in the following way:

100 g. of sodium 2-mercapto-beta,beta-naphthoxazole-7-sulfonate are dissolved in a solution of 65 g. of caustic soda in 1.16 liters of water. 85 ml. of dimethyl sulfate are added dropwise while stirring vigorously, the temperature remaining below 30° C. The solution is then stirred for another hour at 20° C. and the precipitated crystals are suction-filtered and recrystallized from 750 ml. of water. Yield: 95 g. The sensitization maximum is at 456 m$\mu$.

Compound 7

3 g. of sodium 2-methylmercapto-naphth-1',8':4,6-oxazine-3'-sulfonate are heated for 40 minutes at 170° C. with 15 g. of the methyl ester of toluene sulfonic acid. This quaternary salt is slowly introduced while stirring into a solution of 2 g. of N-ethyl rhodanine in 30 ml. of pyridine, the temperature rising to 50° C. This temperature is maintained for another hour and then the solution is left to stand for 12 hours at 20° C. The dyestuff which forms is suction-filtered, washed with n-propanol, dissolved in 100 ml. of methanol and filtered and the filtrate is concentrated by evaporation to 30 ml. The dye slowly crystallizes out. Yield: 0.2 g.; M.P. 295° C.

Sodium 2-methylmercapto - naphth-1',8':4,6-oxazine-3'-sulfonate is prepared as follows:

144 g. of sodium 2-mercapto-naphth-1',8':4,6-oxazine-3'-sulfonate are dissolved in a solution of 42 g. of caustic soda in 950 ml. of water. 55 ml. of dimethyl sulfate are slowly added dropwise while stirring, the temperature being kept below 30° C. The methylation product is precipitated by adding 100 ml. of saturated common salt solution and recrystallized from methanol/water. Yield: 58 g. The sensitization maximum is at 446 m$\mu$.

Compound 8

2.7 g. of 2-methylmercapto-benzoxazole-5-sulfonic acid are heated for 10 minutes at 180° C. with 5.0 ml. of dimethyl sulfate. After adding 20 ml. of cresol, 2 g. of N-ethyl-isopropylidene-rhodanine and 8 ml. of triethylamine, the mixture is stirred for 12 hours at 20° C. The dye that forms is precipitated by adding ether and is suction-filtered. It is dissolved under heat in 2 ml. of n-propanol and 15 ml. of 25% by weight sodium acetate and crystallized. Orange-red crystals, M.P. 169° C.

2-methylmercapto-benzoxazole-5-sulfonic acid is obtained as follows:

231 g. of 2-mercaptobenzoxazole-5-sulfonic acid are dissolved in 1.5 litres of water and 84 g. of NaOH. 110 ml. of dimethyl sulfate are added dropwise in 40 minutes at 20° C., and, after another 20 minutes, the precipitated product is suction-filtered. Yield: 140 g. It is dissolved under heat in 250 ml. of water, the solution is clarified with active charcoal and 50 ml. of 25% by weight NaCl solution are added to the filtrate which is then cooled for 3 hours in ice and the crystals that form are suction-filtered and washed with alcohol. Yield: 75 g.; M.P. above 300° C.

Dye No. 8 sensitizes a silver bromide photographic emulsion with 2 maxima at 551 and 515 m$\mu$.

Compound 9

5.2 g. of sodium 2-methylmercapto-benzthiazole-5-sulfonate are heated for 15 minutes at 180° C. with 10.0 ml. of dimethyl sulfate. After adding 20 ml. of pyridine, 4 g. of N-ethyl-5-isopropylidene rhodanine and 6 ml. of triethylamine, the mixture is stirred for 4 hours at 20° C. The dye that forms is precipitated by adding ether, is suction filtered and recrystallized twice from methanol. Yield: 2.5 g.; M.P. 265–270° C.

Sodium 2-methylmercapto-benzthiazole-5-sulfonate is obtained as follows:

408 g. of 2-mercaptobenzthiazole-5-sulfonic acid are dissolved in 2.28 litres of water and 320 ml. of 50% by weight sodium hydroxide sodium. 300 ml. of dimethyl sulfate are added dropwise in 2 hours at 40° C. allowed to cool after another hour to 18° C. and, after standing for 2 hours, the precipitated product is suction-filtered, washed with alcohol and dried in a vacuum dryer. Yield: 315 g. of colourless, lustrous flakes.

Dye No. 9 sensitizes a photographic silver bromide emulsion with 2 maxima at 575 and 535 m$\mu$.

Compound 10

1.7 g. of sodium 2-methylmercapto-thiodiazole-5-thione-4-phenyl-3'-sulfonate and 0.7 ml. of dimethyl sulfate are heated for 10 minutes at 140° C. After cooling, the melt is triturated and stirred for 4 hours at 20° C. with 2 g. of N-ethyl-5-isopropylidene rhodanine, 20 ml. of pyridine and 2 ml. of triethylamine, the quaternary salt gradually being dissolved. The solution is stood for 12 hours and then the dyestuff is precipitated with ether, washed several times with ether and then boiled with 40 ml. of ethanol. After standing for 3 hours, it is suction-filtered and the dyestuff is recrystallized from 150 ml. of ethanol with 80 ml. of methanol. Yield: 0.3 g.; M.P. 247–252° C., copper red crystals.

For the above reaction, sodium 2-mercaptothiodiazole-5-thione-4-phenyl-3'-sulfonate is prepared as follows:

188 g. of phenylhydrazine-3-sulfonic acid are dissolved in a mixture of 3 litres of methanol, 300 ml. of water and 250 ml. of 50% by weight sodium hydroxide solution. After adding 100 ml. of CS$_2$, the mixture is boiled for 8 hours on a steam bath while stirring. The excess CS$_2$ and 2 litres of methanol are distilled off. After cooling, the solution is filtered and the filtrate is further concentrated by evaporation until all the methanol has distilled off. The solution is then brought to pH 6 with 120 ml. of glacial acetic acid and left to crystallize. The precipitated crystals are suction-filtered, dissolved in 300 ml. of water and, by adding 50 ml. of 20% barium chloride solution, the barium salt is precipitated; this is suction-filtered and washed with water. Yield: 44 g. This barium salt is decomposed in a cooled mixture of 32 ml. of H$_2$SO$_4$ and 200 ml. of water. The pH of the filtered solution is adjusted to 5 to 6 by 150 g. of anhydrous sodium acetate. The sodium salt crystallizes out after standing for 12 hours, is suction-filtered, then extracted by boiling three times with 100 ml. portions of methanol and is dried. Yield: 29 g.; M.P. above 300° C.

The methylation to the 2-methylmercapto reactant is effected as follows: 10 g. of this sodium salt are dissolved in a mixture of 90 ml. of water, 100 ml. of methanol and 2.8 g. of caustic soda. 3.6 ml. of dimethyl sulfate are added dropwise in 1 hour at 10° C. while stirring and then stirred for another hour at 20° C. The precipitated sodium 2 - methylmercaptothiodiazole - 5 - thione - 4 - phenyl - 3'-sulfonate is suction-filtered. Yield: 2.5 g. Another 1.4 g. of colourless crystals are obtained from the mother liquor, by evaporation to 20 ml.

Dye No. 10 has 2 sensitization maxima, at 582 and 536 m$\mu$.

Compound 11

3.6 g. of sodium 1-benzyl-2-methylmercapto-benzimidazole-5-sulfonate are heated for 10 minutes at 160° C. with 5 ml. of dimethyl sulfate and 2 ml. of m-cresol. After cooling, 20 ml. of acetic anhydride, 1.9 g. of N-ethyl-5-ethylidene rhodanine and 9 ml. of triethylamine are added in 3 portions, so that the temperature does not rise above 40° C., and stirring then takes place for another 30 minutes at this temperature. The orange-red dyestuff which forms is precipitated by ether, the ethereal fraction is decanted and the oily residue is triturated with potassium bromide solution. The dyestuff which crystallizes out is suction-filtered and recrystallized from methanol. Yield: 1.0 g.; M.P. above 300° C.

Sodium 1-benzyl-2 - methylmercaptobenzimidazole - 5-sulfonate is obtained as follows: 14 g. of sodium 1-benzyl-2-mercapto-benzimidazole-5-sulfonate are dissolved in 300 ml. of methanol. After adding 50 ml. of 5% by weight sodium ethoxide solution, 7 ml. of dimethyl sulfate are added dropwise at 30° C. After 2 hours, 200 ml. of methanol are distilled off and the remainder is left for crystallization. The precipitated white crystals are suction-filtered and washed with methanol. Yield: 8.25 g.; M.P. above 300° C.

The dye shows a wide sensitization in the green range with a maximum at 550 m$\mu$.

Compound 12

3 g. of sodium 2-methylmercaptobenzthiazole-5-sulfonate and 6 ml. of dimethyl sulfate are heated in an oil bath for 10 minutes at 150° C. the reaction temperature rising to 154° C. After cooling, 15 ml. of pyridine and 3 g. of 1-phenyl-3-methyl-pyrazolone are added and then 3 ml. of triethylamine are slowly added dropwise while shaking. A thin, mobile, yellow paste is formed, and after standing for 3 hours at 20° C., this changes into a yellow, viscous solution, to which 3 ml. of 25% by weight ammonia are added and the quantity is then made up to 100 ml. with 25% by weight ammonium nitrate solution. The dyestuff slowly crystallizes out. The yellow crystals are suction-filtered after 24 hours and recrystallized from 150 ml. of methanol with addition of some active charcoal. Yield: about 0.5 g.; M.P. above 300° C.

Compound 13

3 g. of 2-methylmercapto-benzthiazole-5-sulfonic acid are dissolved in 15 ml. of water and after addition of 5 ml. of dimethylsulfate heated while vigorously stirring to a temperature of 75° C. for 10 minutes. After cooling the reaction product is triturated with 2 g. of 3-ethyl-5-ethylidenrhodanine. Thereafter a mixture of 8 ml. of triethylamine and 5 ml. of pyridine is added. While stirring the reaction mixture rises to a temperature of 60° C. The stirring is continued for 1½ hours at room temperature the resulting dye is suction-filtered triturated with 4 ml. of a mixture of n-propanol-ether (1:1) and suction-filtered again. The residue is washed with 2 ml. of the propanol-ether mixture. 0.7 g. of a raw product are obtained and recrystallized from 150 ml. of methanol. Yield 0.5 g.; M.P. above 300° C., red crystals.

The resulting dye is an orthochromatic sensitizer with two maxima at 576 and 545μ.

Compounds:

(1) 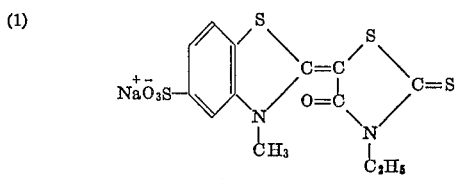

(2) 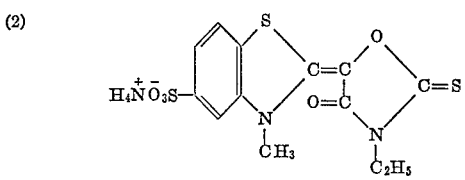

(3) 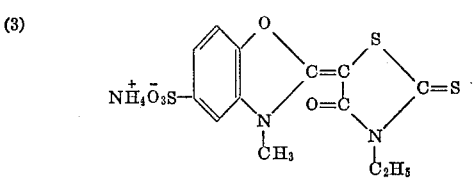

(4) 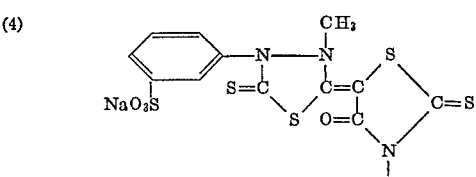

(5) 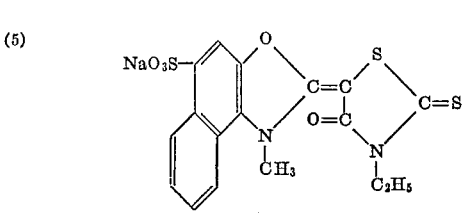

(6) 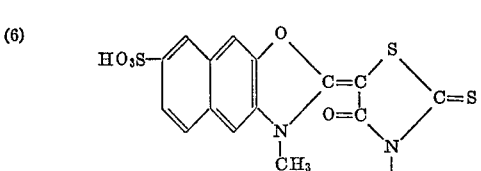

(7) 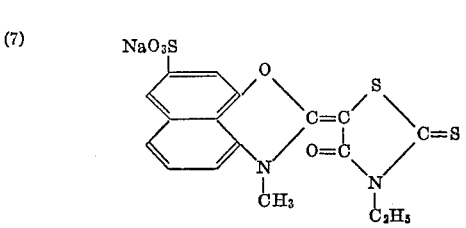

(8) 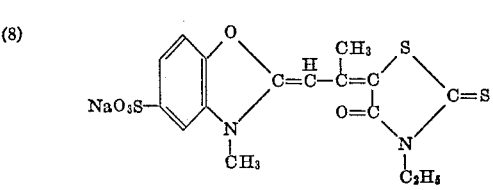

(9) 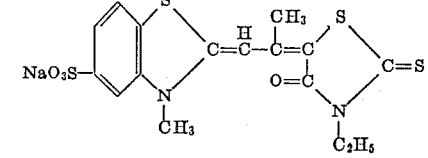

(10) 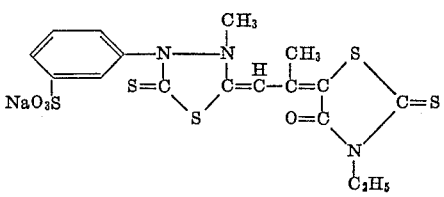

(11) 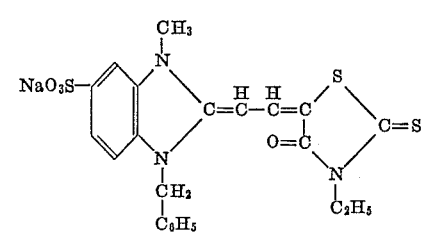

(12) 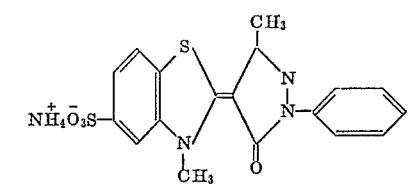

(13) 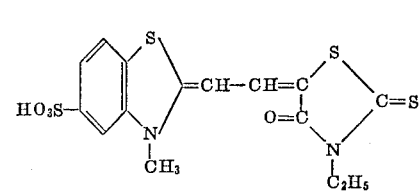

PHOTOGRAPHIC EXAMPLE

A gelatin silver halide emulsion sensitized with one of the dyes of the present invention is prepared by the following procedure:

30 mg. of compound 11 is dissolved in a mixture of water and methanol (1:1) and is added slowly to 1 kg. of a gelatino-silver-halide emulsion while stirring. The silver halides of the emulsion consists of silver bromide containing about 3 mol percent of silver iodide. The stirring is continued until the dye is uniformly distributed throughout the emulsion. The emulsion is cast onto a suitable support such as a sheetlike support of cellulose acetate provided with a subbing layer, and dried.

An orthochromatic light-sensitive material is obtained. Photographic silver halide emulsions containing the sensitizing dyes of the present invention can also contain such addenda as chemical sensitizers, for example, sulfur sensitizers, various gold compounds such as potassium-chloroaurate or auric trichloride, various palladium compounds such as palladium chloride or mixtures of such sensitizers; antifoggants such as heterocyclic mercapto compounds, for example, phenyl-mercapto-tetrazole, mercury compounds, such as described in U. S. Patents 2,728,663 and 2,728,665 or azaindolizines, such as described by Birr in Z. wiss. Phot., vol. 47 (1952), pages 2 to 28.

The silver halide emulsions can also contain color couplers capable of reacting with oxidation products of color-forming developers to form a dye. The color couplers can be present in dissolved or emulsified form.

The accompanying drawing illustrates spectral sensitization curves which have been obtained with 20 mg. per liter of silver chlorobromide solution of each of the dyestuffs 1, 4, 9 and 11 respectively.

The dyes according to the invention are also suitable for the optional sensitization of electrophotographic semiconductor layers, more especially zinc oxide layers. The sensitizing dyes may also be used for emulsions intended for use in silver dye bleach processes.

We claim:

1. A light-sensitive photographic material with at least one supported optically sensitized silver halide emulsion layer containing an effective amount of an optical sensitizer of the formula:

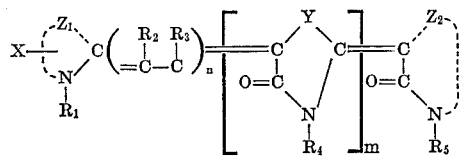

wherein:

$Z_1$ represents the atoms necessary for completing a ring of the group consisting of oxazoles, oxazines, thiazoles, selenazoles, thiodiazoles, oxadiazoles, imidazoles, pyrimidines, pyridines, quinolines, isoquinolines, thiazolines or indolenines;

Y represents a divalent radical of the group consisting of —O—, —S—, —Se—, and

X represents a member of the group consisting of a sulfo-substituted phenyl attached to the adjacent heterocyclic ring by a single chemical bond, a sulfo-substituted phenyl fused to the adjacent heterocyclic ring, a sulfo-substituted naphthyl attached to the adjacent heterocyclic ring by a single chemical bond and a sulfo-substituted naphthyl fused to the adjacent heterocyclic ring;

$Z_2$ represents the atoms necessary for completing a rhodanine, pyrazolone or oxazolidone ring;

R and $R_1$ to $R_5$ each represent a member of the group consisting of hydrogen, alkyl, phenyl and benzyl and m and n each represent an integer from 0 to 3.

2. A light-sensitive photographic material as defined in claim 1 wherein $R_1$ and $R_3$ to $R_5$ each represent a lower alkyl radical.

3. A light-sensitive photographic material as defined in claim 2, wherein n and m are zero.

4. A light-sensitive photographic material as defined in claim 1, in which the optical sensitizer has the formula

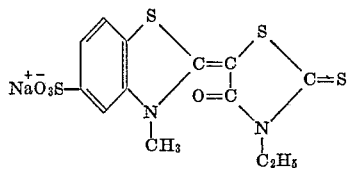

5. A light-sensitive photographic material as defined in claim 1, in which the optical sensitizer has the formula

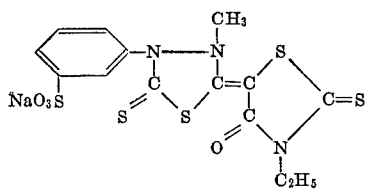

6. A light-sensitive photographic material as defined in claim 1, in which the optical sensitizer has the formula

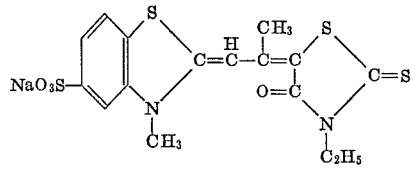

7. A light-sensitive photographic material as defined in claim 1, in which the optical sensitizer has the formula

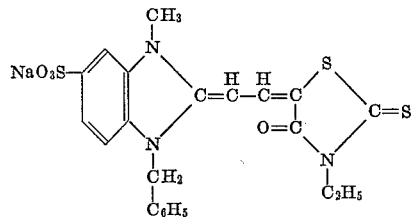

8. An optically sensitized silver halide gelatin emulsion containing an effective amount of an optical sensitizer of the formula

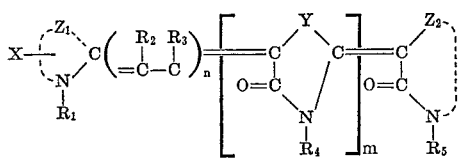

wherein $Z_1$ represents the atoms necessary for completing a ring of the group consisting of oxazoles, oxazines, thiazoles, selenazoles, thiodiazoles, oxadiazoles, imidazoles, pyrimidines, pyridines, quinolines, isoquinolines, thiazolines or indolenines;

Y represents a divalent radical of the group consisting of —O—, —S—, —Se—, and

X represents a member of the group consisting of a sulfo-substituted phenyl attached to the adjacent heterocyclic ring by a single chemical bond, a sulfo-substituted phenyl fused to the adjacent heterocyclic ring, a sulfo-substituted naphthyl attached to the adjacent heterocyclic ring by a single chemical bond and a sulfo-substituted naphthyl fused to the adjacent heterocyclic ring;

$Z_2$ represents the atoms necessary for completing a rhodanine, pyrazolone or oxazolidone ring;

R and $R_1$ to $R_5$ each represent a member of the group consisting of hydrogen, alkyl, phenyl and benzyl, and m and n each represent an integer from 0 to 3.

9. An optically sensitized silver halide emulsion as defined in claim 8 wherein $R_1$ and $R_3$ to $R_5$ each represent a lower alkyl radical.

10. An optically sensitized silver halide emulsion as defined in claim 8, wherein n and m are zero.

11. An optically sensitized silver halide emulsion as defined in claim 8, in which the optical sensitizer has the formula

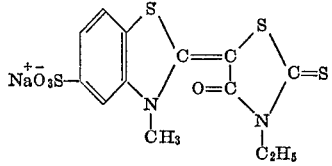

12. An optically sensitized silver halide emulsion as defined in claim 8, in which the optical sensitizer has the formula

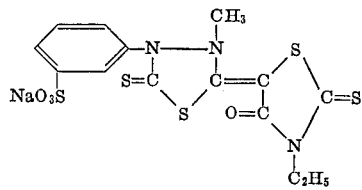

13. An optically sensitized silver halide emulsion as defined in claim 8, in which the optical sensitizer has the formula

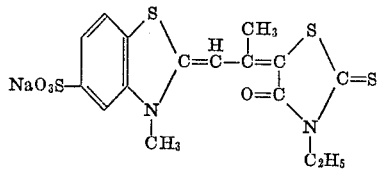

14. An optically sensitized silver halide emulsion as defined in claim 8, in which the optical sensitizer has the formula

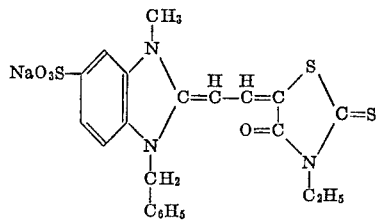

References Cited

UNITED STATES PATENTS

| | | | |
|---|---|---|---|
| 3,148,187 | 9/1964 | Haseltine | 96—106 |
| 2,493,747 | 1/1950 | Brooker et al. | 96—102 |
| 2,895,955 | 7/1959 | Haseltine et al. | 260—240.5 |
| 2,984,664 | 5/1961 | Fry et al. | 260—240.5 |
| 2,304,981 | 12/1942 | Wilmanns | 96—106 |
| 2,870,014 | 1/1959 | Brooker et al. | 96—106 |

J. TRAVIS BROWN, *Primary Examiner.*

NORMAN G. TORCHIN, *Examiner.*